United States Patent [19]
Maystre et al.

[11] Patent Number: 6,032,036
[45] Date of Patent: Feb. 29, 2000

[54] ALARM AND EMERGENCY CALL SYSTEM

[75] Inventors: Jean-Louis Maystre, Cernex, France; Claude Motta, Geneva, Switzerland; Beat Haldemann, Morges, Switzerland; Peider Pinosch, Geneva, Switzerland

[73] Assignee: Telectronics, S.A., Geneva, Switzerland

[21] Appl. No.: 08/878,370

[22] Filed: Jun. 18, 1997

[51] Int. Cl.[7] .................................................. H04Q 7/20
[52] U.S. Cl. ........................ 455/404; 379/40; 340/539
[58] Field of Search .................... 455/404, 403, 455/550, 426, 422; 379/37–40, 45–47, 49; 340/539

[56] References Cited

U.S. PATENT DOCUMENTS

| | | | |
|---|---|---|---|
| 4,855,713 | 8/1989 | Brunius | 340/539 X |
| 5,305,370 | 4/1994 | Kearns et al. | 379/45 |
| 5,319,698 | 6/1994 | Glidewell et al. | 379/39 |
| 5,438,607 | 8/1995 | Przygoda et al. | 379/38 |
| 5,517,547 | 5/1996 | Ladha et al. | 379/40 |
| 5,594,782 | 1/1997 | Zicker et al. | 455/426 X |
| 5,692,215 | 11/1997 | Kutzik et al. | 379/38 X |
| 5,745,849 | 4/1998 | Britton | 455/404 |
| 5,797,091 | 8/1998 | Clise et al. | 455/404 |

Primary Examiner—William G. Trost
Attorney, Agent, or Firm—Ratner & Prestia

[57] ABSTRACT

The alarm and emergency call system having a plurality of local units installed at the users and connected by a telephone line to a central unit having the same design. Each local unit is in radio connection with alarm transmitters and has a control member with an electronic circuit contained in a case, a keypad, and a display unit. Following an alarm signal sent by one of the transmitters, the local unit in question calls different telephone destinations and/or pagers according to a determined cycle. The different function parameters of each local unit are stored in its control member. These function parameters can be entered, adapted or modified remotely from the central unit according to a remote management procedure.

4 Claims, 4 Drawing Sheets

| No Byte | Valeur (décimale) | Explication |
|---|---|---|
| 1 | 24 | Entête fixe |
| 2 | | Version protocole |
| 3 | | Application |
| 4 | 0 | Réserve |
| 5 | 0 | Réserve |
| 6 | 0 – 255 | Longueur LSByte |
| 7 | 0 – 255 | Longueur MSByte |
| 8 | | Message type |
| 9 | 0 – 255 | Donnée utile 1 |
| 10 | 0 – 255 | Donnée utile 2 |
| ⋮ | ⋮ | ⋮ |
| | 0 – 255 | Donnée utile x |
| L + 2 | 0 – 255 | CRC-16 LSByte |
| L + 3 | 0 – 255 | CRC-16 MSByte |

Longueur L (bytes 2 through Donnée utile x)

FIG. 5

ALARM AND EMERGENCY CALL SYSTEM

BACKGROUND OF THE INVETION

The present invention pertains to an alarm/emergency call system comprising a central unit and a plurality of local units connected by telephone lines to the central unit, at least one transmitter being associated with each local unit and being able to send signals of a specific code to the local unit equipped with a receiver intended to receive these signals, each local unit being designed so as to send, upon reception of the said signals, an alarm/emergency call message to at least one recipient via telephone lines, each local unit comprising a keypad and a control member with memory intended to control its function by means of function parameters of the local unit, which parameters are entered into the memory of the control member.

Such systems have been known and used especially by people living alone, the elderly, sick or handicapped people, and they offer reliable protection and security since these people have a reliable and rapid, potential connection to close relations or to specialized services who can come to their aid in case of need. These systems are also very usefull in protecting property.

SUMMARY OF THE INVENTION

The object of the present invention is to improve the prior-art systems and, in particular, their maintenance and updating.

Since the majority of the systems comprise a large number of local units, the operator can perform, in accordance with the present invention, all operations concerning the installation and the maintenance of these local units remotely. The numerous trips that were previously required in relation to the prior-art systems are avoided. The local units can thus be operational, and they can be modified and adapted in a minimum amount of time.

Each local unit is advantageously designed such that it is able to be used as a central unit.

Due to this arrangement, the cost of the systems can be reduced considerably since it is not necessary to manufacture units comprising different electric and electronic components.

According to an advantageous embodiment, the central unit is formed by a local unit connected to a computer, which makes it possible to format the function parameters for the local units and to store all the function parameters of all local units in a data base.

Due to these features, all the function parameters of all local units can be managed reliably and effectively at the level of the central unit. The formatting of the parameters to be entered and modified in the local units is greatly facilitated, without significantly increasing the cost of the systems, since the central unit can be connected to a preexisting, PC type computer.

The control member advantageously comprises a central microcontroller connected by a bus to a peripheral microcontroller, whose memory is able to contain the function parameters, the peripheral microcontroller being connected by a bus to the keypad, to a display unit, to a Dual Tone Multifrequency type receiver, to a Dual Tone Multifrequency type transmitter, to a modem, and to a voice recorder, the central microcontroller being connected by a bus to the receiver, to the modem, and to the display unit, and the local unit also comprising a telephone interface connected to a loudspeaker amplifier, to the modem, to the receiver, and to the Dual Tone Multifrequency type transmitter, and to the voice recorder.

A highly reliable and very simple design comprising a reduced number of components is obtained due to these features.

According to a preferred embodiment, the function parameters comprise telephone numbers of the recipients of the alarm/emergency call messages, the telephone number of at least one monitoring center, an identification member corresponding to the local unit, a predetermined number of alarm and disturbance criteria, telephone numbers of pager receivers with an (alpha)numeric text, the telephone number of the paging center, the telephone numbers corresponding to the recipients whom the user of the local unit can call by pressing a predetermined button of the keypad, the recording of an alarm/emergency call voice message and of a reply message, and the recording of the specific code of the transmitter or transmitters.

Thus, the local unit can be used not only for alarm calls over the telephone line with recorded voice message and reply, but also by the paging call system with an (alpha) numeric text appearing on the pager receiver being called. The extent and the security of the systems are thus increased further.

The function parameters advantageously comprise the triggering or the stopping of a pre-alarm function, which makes it possible to set a local signaling time by the local unit before an alarm or emergency call message is sent, the signaling time of this pre-alarm function, the triggering or stopping of a presence function, which makes it possible to set a period of time during which at least one transmitter or one button of the keypad of the local unit is actuated to avoid the sending of an alarm/emergency call message, the duration of the presence function, the interval between two function controls of the local unit by the central unit, and the language of the display unit.

These measures significantly contribute to the increase in the security of the systems and to the ease of their maintenance.

The local unit is advantageously designed so as to monitor its power supply, the power supply of the transmitters, and the presence of the telephone line, to display any disturbance, and to transmit the disturbances linked with its power supply and with that of its transmitter to a monitoring center.

Any failure can thus be detected in time, which is an added security factor.

Other advantages appear from the features described in the following, more detailed description of the present invention on the basis of the drawings, which show one embodiment and one variant schematically and as an example.

DETAILED DESCRIPTION OF THE INVENTION

Figure 1:
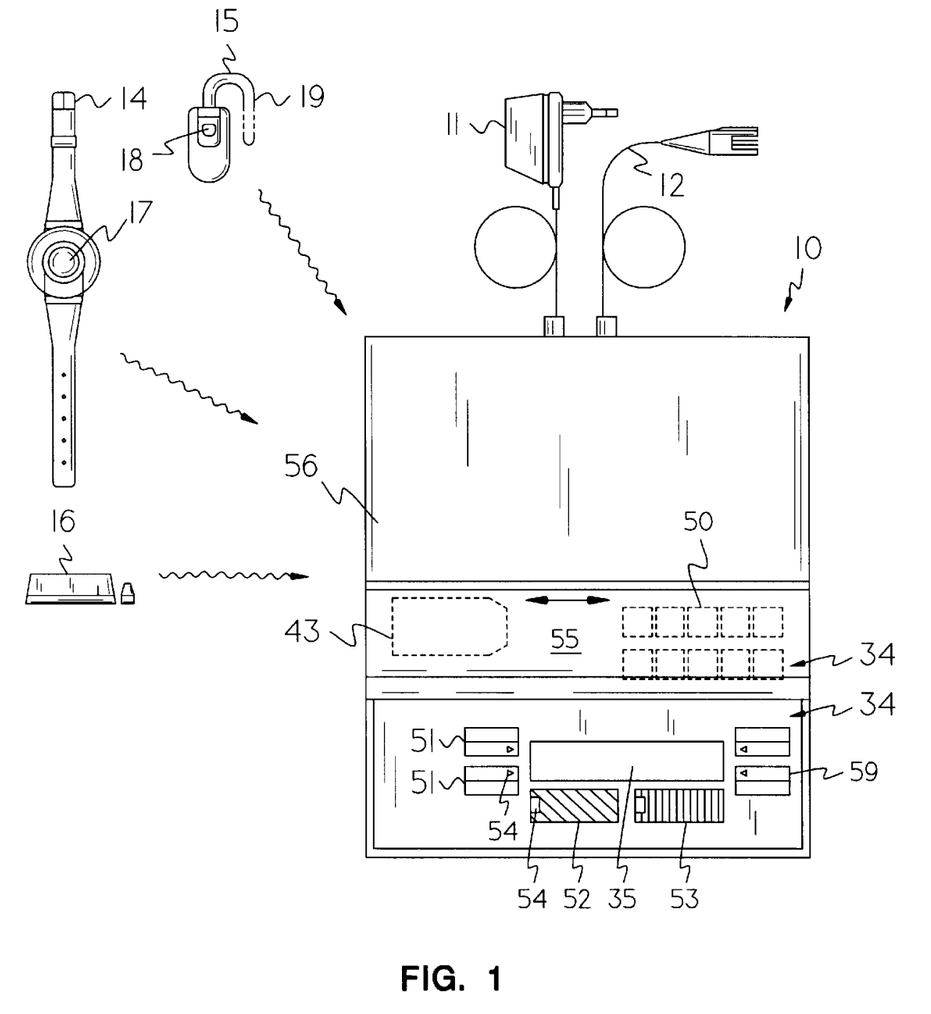
FIG. 1 shows schematically a local unit of an alarm/emergency call system constructed in accordance with the present invention.
Figure 2:
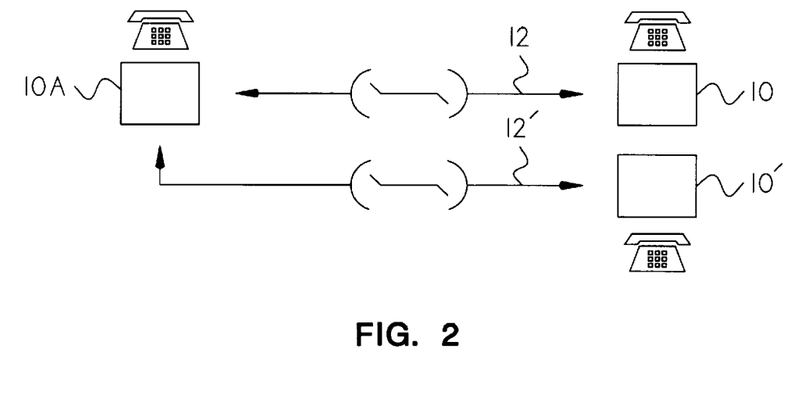
FIG. 2 shows an alarm/emergency call system constructed in accordance with the present invention.

In reference to FIGS. 1 and 2, the alarm/emergency call system comprises a local unit 10 installed at the user. For the embodiment of the invention shown in FIG. 2, two local units 10 and 10' are connected to a central unit 10a by means of telephone lines 12 and 12' respectively. This local unit is supplied with power from the power supply line by means of a power module 11 and is connected by the cable 12 to the telephone network. The local unit is connected to the existing telephone line and it does not interfere with the normal function of the telephone in any way. It is connected directly to the main telephone line and it connects the telephone line in series to the existing sets of the user.

The local unit 10 is in radio connection via wireless transmission with a series of peripheral devices 14, 15, 16 that are able to send a radio signal to the local unit 10.

These peripheral devices comprise a transmitter 14 worn in the manner of a wrist watch by the user and comprising an alarm button 17 capable of inducing the sending of a radio signal received by the local unit 10, a transmitter 15 in the form of a pendant to be worn around the user's neck and a wireless contact detector 16 for doors and windows. The sending of the radio signal by the pendant-like transmitter 15 can be triggered by pressing the button 18 or by pulling the wire 19. The sending of the radio signal by the detector 16 is activated by the opening of a door or window. The detector 16 can be used either as a detector transmitter ensuring the checking of the presence of a person or as an alarm device against an intrusion. When the local unit is put into operation, a decision is made to register it in the bank of presence transmitters or in that of the alarm transmitters.

It is, of course, possible to provide two or more detectors 16, one operating as a presence transmitter and the others as alarm transmitters. The radio connection between the different peripheral devices and the local unit eliminates the local installation of cables. The signal of each transmitter is characteristic and different from the signals of the other transmitters and is recognized as such by the local unit 10.

Figure 4:
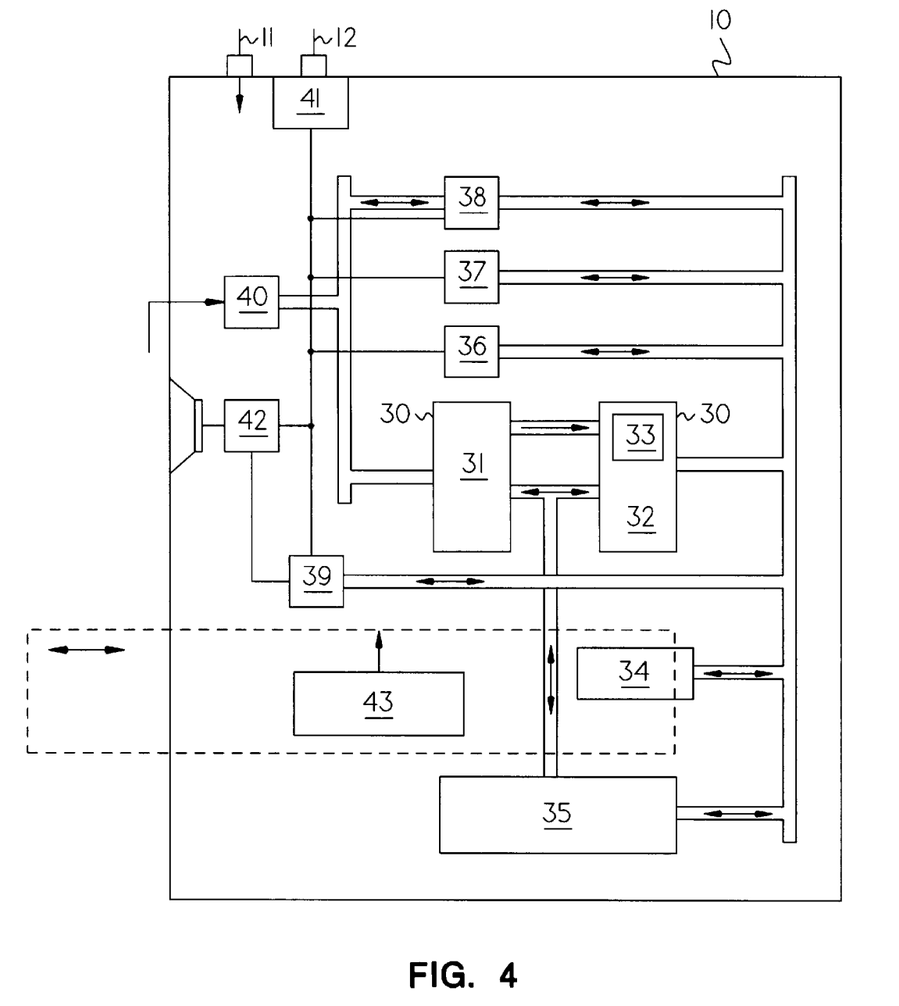
FIG. 4 shows a schematic view of the components of the local unit of FIG. 1.

FIG. 4 shows the various components of the local unit 10 that are necessary to carry out all the alarm, emergency call and presence check functions.

To achieve this, this unit comprises a central control unit 30 formed by a microcontroller 31 (e.g., IC80C31 from INTEL), which is connected by a bus to a peripheral microcontroller 32 programmable by the user (e.g., IC PS D 511 from WSI) containing the application program 33, which may be written, e.g., in language C (5.1.).

The peripheral microcontroller 32 is connected by a bus to a keypad 34, to a liquid-crystal display unit 35, to a DTMF (Dual Tone Multifrequency Receiver) type receiver 36, to a DTMF (Dual Tone Multifrequency Transmitter) type transmitter 37, and to a modulator-demodulator or modem 38, as well as a voice recorder 39 (e.g., IC ISD 1020 from ISD).

The microcontroller 31 is connected by a bus to the radio receiver 40 (e.g., IC 3363 from Motorola) with an antenna, to the modem 38, and to the display unit 35. The local unit 10 also comprises a telephone interface 41 connected to a loudspeaker amplifier 42, to the modem 38, to the DTMF receiver 36, to the DTMF transmitter 37, and to the voice recorder 39.

The local unit 10 is supplied with power by the power module 11, but is it also comprises a backup battery 43 to take over the power supply in the case of power failure. The presence of the power module 11 and the charging of the backup battery 43 are checked continuously and at least once a day, respectively.

The keypad 34 of the local unit comprises, on the one hand, a concealed alphanumeric keypad 50 with the backup battery 43 under a cover 55 mounted slidingly on the case 56, and, on the other hand, two, so-called user-friendly selection buttons 51, two buttons 59 for putting into operation, and two larger buttons 52, 53 of red and green color surrounding the display unit 35. The red button 52 corresponds to the alarm button, which makes it possible to trigger an alarm and emergency call procedure, and the green button 53 is used as a cancel button for canceling the alarm and emergency call procedure. The two buttons 52, 53 have an indicator light 54 indicating that the button has been pressed.

The two user-friendly buttons 51 make it possible to call two selected telephone numbers recorded in the memory, which the user of the local unit 10 calls frequently.

The 10 buttons of the concealed alphanumeric keypad 50 are used only to enter the function parameters of the local unit 10 during its installation or modifications.

In reference to FIG. 2, the local unit 10 is connected via the telephone network to a central unit 10a, the so-called management unit, from which all the function parameters of the local unit 10 can be remotely entered by a remote management process. This central unit 10a is of the same type as the local unit 10 and comprises the same electric and electronic components.

Figure 3:
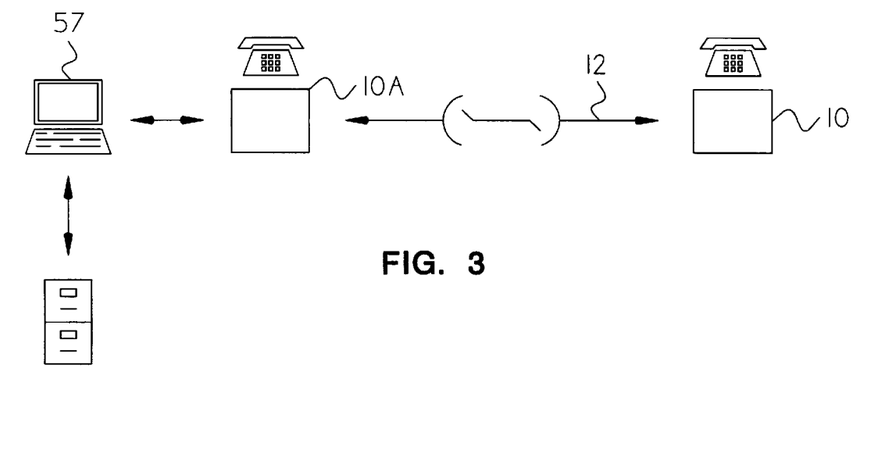
FIG. 3 shows a variant of the system of FIG. 2.

According to a variant shown in FIG. 3, the central unit 10a may be connected to a computer 57, which makes it possible to more easily format the function parameters of the local units 10 of the users. The operator of the central unit 10a thus benefits from the user friendliness of the computer. He thus has a display unit and a complete keypad, and additionally a memory to store the data base containing all the function parameters of all users. The data can be printed and the operator can set up a file for each user. The computer 57 makes it possible to look up the data of each local unit 10 and to enter or modify the function parameters of each local unit 10 via the central unit 10a. The two operations are possible only if it is authorized by the user of a local unit 10 by pressing a predetermined button of the keypad 34. The central unit 10a now loads all the function parameters into the local unit 10.

Different function parameters may be configured on the local unit 10, and they comprise four principal modes of operation, namely, functioning during the waking hours, the transmission of an alarm to a private destination, the transmission of an alarm and of a disturbance to a center or to a destination of a paging receiver or pager.

The device also comprises a cyclic call function intended to check the functioning of the local unit 10 at predetermined intervals.

During the waking hours, the local unit 10 has four principal operations:

The local unit 10 has two user-friendly buttons 51. This is an aid facilitating the numbering for people called frequently. In fact, by pressing one of the two user-friendly buttons, the prerecorded number is dialed by the local unit.

The local unit 10 receives alarms from the transmitters 14 through 16 or from the red button 52, and it establishes a communication for the transmission of this alarm to private destinations, to a monitoring center or to pagers.

The local unit 10 checks the presence of the user. If there is no action during a prerecorded period of time, e.g., pressing a button of the keypad or activation of a radio transmitter, an alarm is transmitted.

The local unit monitors the 230-V network, its backup battery 43, the batteries of the radio transmitters 14 through 16, and the presence of the telephone line 12. Any disturbance is displayed on the local unit, and the first three disturbances can be transmitted to a monitoring center or a pager.

All the function parameters of the local unit 10 are entered by means of 16 buttons of the keypad 34. The 10 (alpha) numeric buttons 50 of the keypad are used to select and enter the telephone numbers, to enter the access codes, the identification numbers of the local unit, other criteria defining the alarms, and the disturbances as well as (alpha)numeric messages.

The four buttons 51 and 59 are intended to select the multiple choices appearing on the screen 35.

The red button 53 is used to delete a parameter, and the green button 52 is used to validate a selection, a parameter and to scroll in an entry sequence.

The parameter entry procedure is accessed by pressing the "0" button of the keypad 50. The four main entry menus will now appear: Call number, messages, definition of the radio transmitters, and other parameters. These four main menus are called by means of the user-friendly buttons 51 and 59.

The "Call Number" main menu makes it possible to enter one to eight call numbers, comprising:

a) the private telephone numbers;
b) the calling of a monitoring center by means of
b1) its access code,
b2) the identification number of the local unit 10,
b3) eight alarm and disturbance criteria per call, namely, emergency call, silent alarm, presence alarm, disturbance due to power failure, disturbance of the transmitter battery, disturbance of the backup battery, cyclic call;
c) the pager telephone numbers with an (alpha)numeric text;
d) the telephone number of the PAGING center; and
e) the two telephone numbers corresponding to the two user-friendly buttons 51.

The message main menu makes possible the entry of a call message and of a reply message by means of a voice recorder 39 and listening to the two messages.

It should be noted regarding the main menu for the radio transmitters 14 through 16 that each transmitter is capable of transmitting a radio signal of a code that is different from that of the other transmitters. The local unit has the capability of learning by self-learning the radio codes of five transmitters intended for the alarm calls and another five radio codes of five transmitters intended to check the presence of the user of the local unit 10. These codes are recorded by successively actuating the transmitters and by confirming the codes received by means of the green button 53.

The main menu of the other parameters pertains to the pre-alarm function, the presence function, the cyclic call function, and the display language.

The pre-alarm function makes it possible to set the duration of acoustic signaling by the local unit 10 in seconds from 0 to 99 before the emergency telephone call procedure is triggered. The user can stop the call procedure during this time, e.g., in the case of an unintended, accidental triggering of an alarm signal. The menu also offers the option of stopping the alarm procedure during the pre-alarm period by means of a radio transmitter 14, 15.

For the presence function, it is possible to set the duration of the presence check from 1 to 99 hours. The duration of presence check determines the time after which a presence alarm is sent, if pressing of buttons of the local unit 10 or transmission by one of the radio transmitters 14 through 16 was not detected during this time. It is possible to trigger and stop this presence function.

For the cyclic call function, it is possible to set a duration of 1 to 999 hours, which is the time between two function checks of the local unit 10.

The language of the display unit 35, e.g., French, German, Italian, or English, can be selected by the language function by means of the buttons 51.

In the case of an alarm, the different destinations are called one after another. This alarm cycle is repeated up to four times. The local unit 10 stops if one of the destinations acknowledges the alarm or after the four unsuccessful cycles.

To check the programming of the local unit 10, there is a procedure that makes it possible to call each destination individually. The local unit makes a single call only, whether it is acknowledged or not. This test mode is activated if an alarm is triggered by pressing the red button or by a transmitter and one of the buttons 1 through 8 is pressed during the duration of the pre-alarm. Thus, the destinations 1 through 8 are called directly.

The following parameters are entered when a local unit 10 is energized for the first time:
the display language,
at least one radio alarm code of a radio transmitter 14 through 16,
at least one private number with the voice call message, or
at least one pager number, or
at least one number of the monitoring center with the identification number of the local unit 10 and at least one alarm or disturbance criterion.

In addition to the local entry in the local unit 10, the device offers a remote management process and design that makes it possible to remotely configure one or more local units 10, with more convenience and with computerized customer management.

This process and design makes it possible for the central unit 10*a* to remotely manage, read and act on one or more local units 10. The central unit 10*a* acts as a management unit and may be of the same type as the local unit 10.

Two types of communication are possible via the telephone network between the central unit 10*a* and the local unit 10. The MODEM type communication, as defined in Opinion No. V.21 or V.22 of the Comité International pour le Télégraphe et le Téléphone (CCITT). The speed of transmission in CCITT V.21 with frequency modulation is 300 baud, and that in CCITT V.22 with phase modulation is 600 baud. The communication is asynchronous semiduplex.

The second manner of communication is of the DTMF (Dual Tone Multifrequency) type, according to which 4-bit blocks are coded by a frequency pair. The coded signals are defined by a signal time of 25 msec and a pause time of 25 msec. The speed of transmission is 20 baud. The communication is semiduplex. The DTMF type communication is preferably used in the present system due to its high precision and reliability.

The communication is established according to the CCITT V.25 procedure in the MODEM type and according to the standards SR. 784.103.12/3.1/1 OFCOM (Office Fédérale Communication) in the DTMF type by the timed transmission of 1,300-Hz beep tones.

As an option, the communication may include a scrambling function. The exchange of information takes place by means of datagrams of variable length. To check the security of the data transmission, each datagram is checked by calculating two longitudinal check bytes according to the CRC-16 specifications of the CCITT.

The only two types of datagrams are of the command confirmation type and of the request reply type. The communication can be established by the central unit 10a or the local unit 10, but once the communication has been established, the exchange of datagrams is guided by the central unit.

Each communication is terminated by the polling sequence sent by the central unit 10a and the release sent by the local unit 10.

Figure 5:
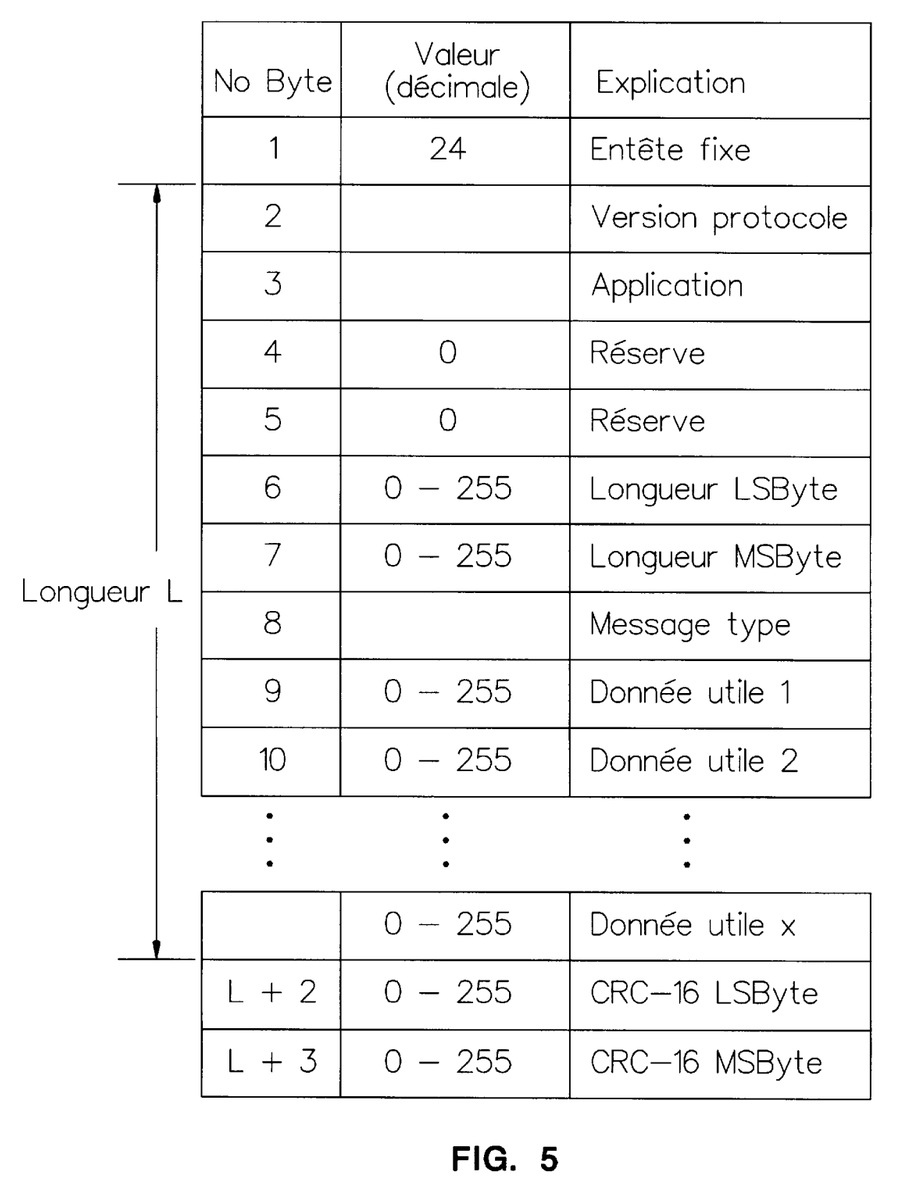
FIG. 5 shows a table corresponding to the structure of a datagram transmitted between the central unit and the local unit.

The structure of a datagram is shown in the table in FIG. 5. It comprises a header, e.g., in the form of the fixed value of 24 decimals, followed by the number of the version and of the application and two reserve bytes. These are followed by the two bytes 6 and 7 intended to check the transmission according to the CRC-16 CCITT specifications. Byte 8 is intended to characterize the type of message being sent, namely, general reading (decimal value=10), selective reading (=11), programming (=20), polling (=30), remote control (=40), reading reply (=110), programming reply (=120), polling reply (=130), remote control confirmation (=140), or error (=250).

The useful data to be transmitted are then sent in the bytes 9 with L+1. The last two bytes L+2 and L+3 are devoted to the confirmation of the transmission check according to the CRC-16 CCITT specifications. The length L of the datagram is calculated from byte 2 over the entire datagram without the last two check bytes.

The useful data are defined according to a particular structure comprising an identification digit preceding the data to be entered or modified. Thus, the digits 0 through 103 correspond to the following data or parameters to be entered:

| | |
|---|---|
| 0 | telephone number of the PAGING center, |
| 1 through 8 | emergency call telephone numbers that the local unit calls in the case of an alarm, |
| 9 | telephone number of the local unit in question, |
| 10 through 11 | telephone numbers corresponding to the user-friendly buttons 51, |
| 20 through 27 | numeric and alphanumeric messages of the emergency calls on the pagers, |
| 40 through 47 | identification numbers of the local unit for a call to a monitoring center, |
| 60 through 67 | the eight alarm and disturbance criteria, |
| 81 | the display language, |
| 82 | presence check triggered or stopped, |
| 83 | possibility of stopping or not stopping the alarm procedure during the pre-alarm period, |
| 84 and 85 | duration of presence check in hours and tens of hours, |
| 86 and 87 | duration of the pre-alarm period in seconds and tens of seconds, |
| 88 through 90 | time interval between two cyclic call checks in hours, tens and hundreds of hours, |
| 100, 101 | recording of the voice call message, and |
| 102, 103 | recording of the reply voice message. |

The identification digits not mentioned, 12 through 19, 28 through 39, 48 through 59, 68 through 80, and 91 through 99, are reserves.

It should be noted that the structure of each local unit 10, represented in FIGS. 1 and 4, is such that it can be installed as a central unit 10a capable of being used as a station for entering and modifying the function parameters for the remote local units 10. The operator enters the telephone number of the remote user. The central unit 10a calls him by hands-free communication. The operator explains to the user that the function parameters of his local unit 10 will be changed and asks him to press a predetermined button, e.g., the green button 53, for 5 seconds. The central unit 10a then loads all the parameters, including the voice messages, if desired, into the local unit 10, and returns to hands-free communication to permit the operator to greet the customer.

According to the variant shown in FIG. 3, the operator can prepare the parameters to be entered or modified more easily on the computer 57, but the communication procedure between the two units, namely, the central unit and the local unit, remains the same.

This remote management or remote data entry procedure offers the advantage that the operator does not have to visit each user to update the function parameters of each local unit 10. Thus, when telephone numbers are changed, the operator can modify the parameters from the central unit 10a.

Since the central unit 10a may, in addition, also be connected to a computer, e.g., a PC type computer, the operator has the possibility of setting up and entering into the memory a complete file of all the function parameters entered in each local unit installed at each user. In case of modifications, it is possible to prepare all the parameters to be entered on the computer and to subsequently enter them according to the above-described procedure.

While in the foregoing there have been described preferred embodiments of the present invention, it should be understood by those skilled in the art that various modifications and changes can be made without departing from the true spirit and scope of the present invention.

What is claimed:

1. Alarm/emergency call system, comprising:
   a central unit connected to a computer making it possible to:
      (a) form function parameters for a plurality of local units, and
      (b) store the function parameters of the local units in a data base,
   the function parameters comprising at least one of the following:
      (a) the telephone numbers of the recipients of alarm/emergency call messages,
      (b) the telephone number of at least one monitoring center,
      (c) an identification number corresponding to the local unit,
      (d) a predetermined number of alarm and disturbance criteria,
      (e) the telephone numbers of pager receivers to be called with an (alpha) numeric text,
      (f) the telephone number of the paging center,
      (g) the telephone numbers corresponding to the recipients that the user of the local unit can call by pressing a predetermined button of a keypad,
      (h) the recording of a voice alarm message/call message and a reply message, and
      (i) the recording of the specific code of a transmitter of associated with the local unit;
   a plurality of local units, each:
      (a) identical to the central unit,
      (b) designed so as to be able to be used as a central unit,
      (c) connected by a telephone line to the central unit,
      (d) designed so as to send, upon reception of signals, an alarm/emergency call message to at least one recipient over the telephone line, (e) having at least one transmitter associated with each local unit capable of sending signals of a specific code to the associated local unit, and
(f) having:
  (1) a receiver intended to receive signals sent by the associated transmitter,
  (2) a keypad,
  (3) a display unit,
  (4) a Dual Tone Multifrequency type receiver,
  (5) a Dual Tone Multifrequency type transmitter,
  (6) a modem,
  (7) a voice recorder, and
  (8) a control unit having:
    (i) peripheral microcontroller having memory capable of containing the function parameters and connected by a bus to:
      the keypad,
      the display unit,
      the Dual Tone Multifrequency type receiver,
      the Dual Tone Multifrequency type transmitter,
      the modem, and
      the voice recorder, and
    (ii) central microcontroller connected by a bus to:
      the peripheral microcontroller,
      the receiver,
      the modem, and
      the display unit,
  (9) a loudspeaker amplifier, and
  (10) a telephone interface connected to:
    (i) a loudspeaker amplifier,
    (ii) the modem,
    (iii) the receiver,
    (iv) the Dual Tone Multifrequency type transmitter, and
    (v) the voice recorder; and
means intended to enter and modify the function parameters of the local units by the telephone line from the central unit.

2. System in accordance with claim 1, characterized in that the function parameters comprise the triggering or the stopping of a pre-alarm function, making it possible to set a local signaling time by said local unit before an alarm/emergency call is sent; the duration of signaling of the pre-alarm function; the triggering or stopping of a presence function, which makes it possible to set a period of time during which at least one transmitter or one button of said keypad of said local unit must be actuated to avoid the sending of an alarm/emergency call; the duration of the presence check; the interval of time between two function checks of said local unit by said central unit, and the language of said display unit.

3. System in accordance with claim 3, characterized in that the function parameters are entered into said local units by means of datagrams, whose transmission over the telephone line is controlled by calculating longitudinal check bytes.

4. System in accordance with claim 3, characterized in that the function parameters are entered in said local units by the telephone transmission of Dual Tone Multifrequency (DTMF) type signals.

* * * * *

UNITED STATES PATENT AND TRADEMARK OFFICE
CERTIFICATE OF CORRECTION

PATENT NO. : 6,032,036
DATED : February 29, 2000
INVENTOR(S) : Jean-Louis Maystre, Claude Motta, Beat Haldemann, Peider Pinosch It is certified that error appears in the above-identified patent and that said Letters Patent is hereby corrected as shown below:

At Column 10, line 21, "3" should read --2--.

Signed and Sealed this

Sixth Day of February, 2001

Attest:

Q. TODD DICKINSON

*Attesting Officer*     *Director of Patents and Trademarks*